United States Patent [19]
Keshavachar

[11] Patent Number: 6,108,545
[45] Date of Patent: *Aug. 22, 2000

[54] MECHANISM FOR EXTENDING BATTERY LIFE IN A GSM MOBILE STATION

[75] Inventor: Bhaktha Keshavachar, Chandler, Ariz.

[73] Assignee: Intel Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/865,738

[22] Filed: May 30, 1997

[51] Int. Cl.⁷ .............................. H04B 1/38; H04B 1/16; G08C 17/00

[52] U.S. Cl. ..................... 455/436; 455/574; 455/343; 370/311

[58] Field of Search .................................. 455/574, 343, 455/575, 572, 434, 515, 436; 370/311

[56] References Cited

U.S. PATENT DOCUMENTS

| | | | |
|---|---|---|---|
| 5,301,225 | 4/1994 | Suzuki et al. | 379/59 |
| 5,507,039 | 4/1996 | Honma | 455/343 |
| 5,627,882 | 5/1997 | Chien et al. | 379/61 |
| 5,722,070 | 2/1998 | Alford | 455/425 |
| 5,794,146 | 8/1998 | Sevcik et al. | 455/434 |

*Primary Examiner*—Fan Tsang
*Assistant Examiner*—Sheila B. Smith
*Attorney, Agent, or Firm*—Steven X. Laut

[57] ABSTRACT

A process for conserving battery power in a GSM mobile. The process starts when the mobile receives a first signal from a user of the mobile. The mobile then monitors cell information and paging information for a present cell to determining whether the paging information for the present cell is valid; and, only if said paging information is invalid, then monitoring cell information for a surrounding cell.

20 Claims, 4 Drawing Sheets

MECHANISM FOR EXTENDING BATTERY LIFE IN A GSM MOBILE STATION

BACKGROUND OF THE INVENTION

1. Field of the Invention

The present invention relates to the field of cellular telephone networks. Specifically, the present invention is directed at conserving battery power for a cellular telephone.

2. Description of Related Art

In the prior art GSM System, a service area, which can be a metropolitan city, is subdivided into cells. For every group of cells is a base station which communicates with one or more mobile stations (i.e., one or more mobile telephones, each referred to as a "mobile"). The base stations in turn are connected to a base station controller. In addition, a mobile switching center (MSC) is used to communicate with all the base station controllers in the GSM system and to keep track of the latest position of each of the mobiles. Thus, the MSC knows in which cell each mobile is currently located.

The GSM system needs to know the mobile's latest position because the MSC uses that information to "page" the mobile—i.e., the location information is used to notify the mobile of an incoming call. The MSC sends the paging message only to the cell in which the mobile is located so as to avoid the resource wasteful technique of sending a paging message over all cells. For example, when the mobile moves from a first cell to a second cell in idle mode, the mobile signals the MSC to inform the GSM system that the mobile has changed cells. Subsequently, when the GSM system wants to signal the mobile, the GSM system transmits the paging message only in the cell where the mobile is currently located.

Thus, a major concern which exists in the GSM system is updating the location of each mobile—i.e., the GSM system has to be kept aware of in which cell each mobile is currently located. Moreover, the GSM system has to be aware of the mobile's location when the user is constantly moving, regardless of whether the user is on the phone (i.e., the mobile is idle).

To accomplish this in the GSM system, each cell constantly broadcasts its identity and other relevant parameters on a beacon signal using a beacon frequency. Each cell has a different beacon frequency from its neighbor. A mobile detects movement from one cell to the next by periodically detecting and comparing the signal strength of the beacon signal of the current cell (i.e., the cell in which the mobile is currently located), to the signal strengths of the beacon signals of the surrounding cells. During the detection process, the mobile receives information that is needed to identify each cell on a broadcast control channel (BCCH). In addition, for the present cell, the mobile has to monitor and decode a paging channel (PCH) to detect the presence of incoming calls. The BCCH and PCH are contained on this beacon signal.

The monitoring and comparison process is performed every 30 seconds. If the signal strength from one of the other cells becomes more powerful than the present cell from a radio power perspective, the mobile will switch to that other cell and notify the GSM system.

FIG. 1 is a diagram of the prior art GSM system having a set of cells C1, C2, and C3, each having base station transceiver BST1, BST2, and BST3, respectively, located therein. Base station transceivers BST1, BST2, and BST3 communicate with base station controller BSC1 of a set of BSCs BSC1 through BSCn. Set of BSCs are connected to mobile switching center MSC1. A mobile MS1, located in cell C3, communicates with MSC1 through the use of base station BST3 and base station controller BSC1.

As described above, to allow the GSM system to locate mobile MS1, mobile MS1 is responsible for notifying mobile switching center MSC1 every time mobile MS1 moves from one cell to another. This notification is termed a "registration" and occurs only if mobile MS1 is in idle mode and mobile MS1 happens to change cells. The traffic that results from mobile MS1 notifying mobile switching center MSC1 of the present cell location of mobile MS1 is called registration traffic. For example, as mobile MS1 moves out of the present cell, cell C3, and the signal strength of the beacon signal from one of the surrounding cell (e.g., either cell C1 or cell C2) becomes more powerful than the one from the present cell, mobile MS1 will decide to switch over to that cell. After mobile MS1 switches to the new cell, mobile MS1 will send a registration to MSC1.

FIG. 2 is a flow diagram of the prior art monitoring and decoding process illustrating the typical operation of a mobile in the GSM system. The mobile has been powered-up and placed in idle mode (i.e. the user has turned on the mobile but has not initiated or received a call with the mobile).

In block 102, the mobile detects and synchronizes the mobile's internal clock to the transmission of the present cell. In FIG. 1, for example, mobile MS1 synchronizes itself with cell C3. Thus, the mobile selects cell C3 (depending on signal strength or other reasons), synchronize to it and makes sure that it has successfully decoded the BCCH and other info that comes on the beacon signal of cell C3. After synchronization has occurred, operation will continue with block 104.

In block 104, the mobile decodes the BCCH portion of the transmission of the present cell.

In block 106, the mobile measures the signal strength of the beacon signal of the present cell. In FIG. 1, for example, mobile MS1 measures the signal strength of the beacon signal of cell C3. The signal strength is stored for comparison of the signal strengths of the beacon signals for the surrounding cells.

In block 108, the mobile decodes the PCH for paging messages which will indicate to the mobile that there is an incoming call designated for the user.

In block 110, if the decoded PCH from block 108 contains a paging message, then operation will continue with block 112. Otherwise, operation will continue with block 114.

In block 112, the mobile has detected a paging message during the decoding of the PCH in block 108. Thus, the mobile enters into a dedicated mode to receive the call.

In block 114, if the mobile has not found a paging message during the decoding of the PCH in block 108, then the mobile will synchronize to a beacon signal of a surrounding cell. For example, referring to FIG. 1, the mobile synchronizes the monitoring and timing circuits of the mobile to the beacon signal of cell C2, which is a cell adjacent to the present cell, cell C3.

In block 116, the mobile decodes the BCCH of the surrounding cell. Operation will then continue with block 118.

In block 118, the mobile measures the signal strength of the beacon signal of the surrounding cell and store the value into a table containing a list of cells and the signal strengths of the beacon signals of each cell.

In block 120, the mobile re-orders the list of signal strengths of the camped cell and surrounding cells in an increasing order of beacon signal signal strengths.

If the beacon signal signal strength of the surrounding cell is stronger than the beacon signal signal strength of the present cell, indicating that the mobile has moved into the surrounding cell, then the mobile will notify the GSM system that the surrounding cell is now the new present cell so that the GSM system will send all paging messages only to the new present cell.

If the signal strength of the beacon signal of the present cell is still the strongest, then the mobile will know that it is still in the present cell, and the monitoring and processing cycle will end until the time of the next cycle.

It is to be noted that operations contained in block 114 to block 120 is repeated until the signal strength of all surrounding cells have been measured and inserted into the cell table. Thus, for example, in FIG. 1, the BCCH and beacon signal signal strength of cell C1 is captured and measured, respectively, before the mobile proceeds with block 120.

Thus, in the GSM system, the mobile has to monitor the signal strength of the beacon signals of all surrounding cells every 30 seconds in addition to monitoring the signal strength of the beacon signal of the present cell to be able to determine whether or not it is moving. However, every time the mobile monitors the surrounding cells, the mobile has to expend power as the circuits which are used to perform the monitoring have to be supplied power while monitor the additional surrounding cells. In addition, the processing logic such as that used to determine the strongest beacon signal also expends power to perform the comparison functions.

For example, in FIG. 1, mobile MS1 not only has to expend power to monitor the present cell, cell 3, but also has to expend power monitoring the surrounding cells, cell C2 and cell C1. Moreover, MS1 would also have to expend power to re-order the signal strengths of the beacon signals of the present and surrounding cells. This reordering occurs so that when the mobile leaves the present cell, the mobile knows which surrounding cell has the highest signal strength and use that surrounding cell as the new present cell.

This periodic monitoring and comparing is wasteful in cases when a user is be fairly stationary and not be moving from cell to cell. For example, the user can go inside a building and still stay in the same cell. The power consumption is especially wasteful when there many surrounding cells, such as in a metropolitan area. Thus, if the user will be in a general area, performing this periodic monitoring and comparing of surrounding cell beacon signal strengths is unnecessary and it would be desirable to eliminate this period monitoring and comparing.

SUMMARY OF THE INVENTION

A special mode is implemented in the operation of the mobile. In this mode, a process is implemented which includes the steps of receiving a stationary time period; monitoring cell information for a present cell; monitoring paging information for the present cell; determining whether the stationary time period has been reached; and, only if the stationary time period has been reached, then monitoring cell information for a surrounding cell.

DETAILED DESCRIPTION OF THE INVENTION

Currently, the mobile monitors and decodes the BCCH and the PCH for the present cell. In addition, the mobile has to monitor and decode the BCCH and process the decoded information for the surrounding cells. The present invention allows for the elimination of overhead that the mobile has to support in order to perform the monitoring and processing of the BCCH of the surrounding cells.

In a preferred embodiment, the user inputs period of time where the user will be in a specific location. The mobile goes into a special mode and operate as described below, for the specified time period.

Figure 1:
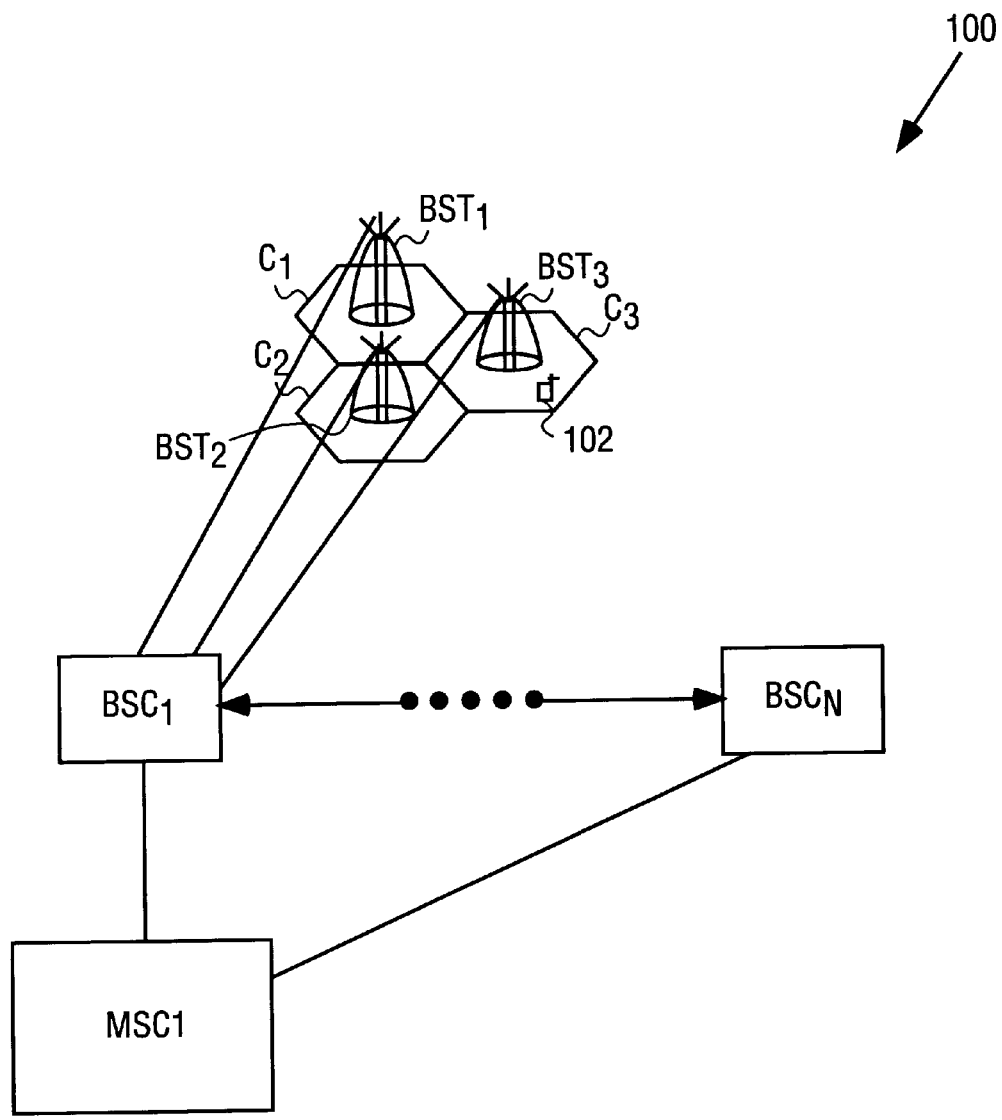
FIG. 1 is a diagram of a prior art GSM system.
Figure 2:
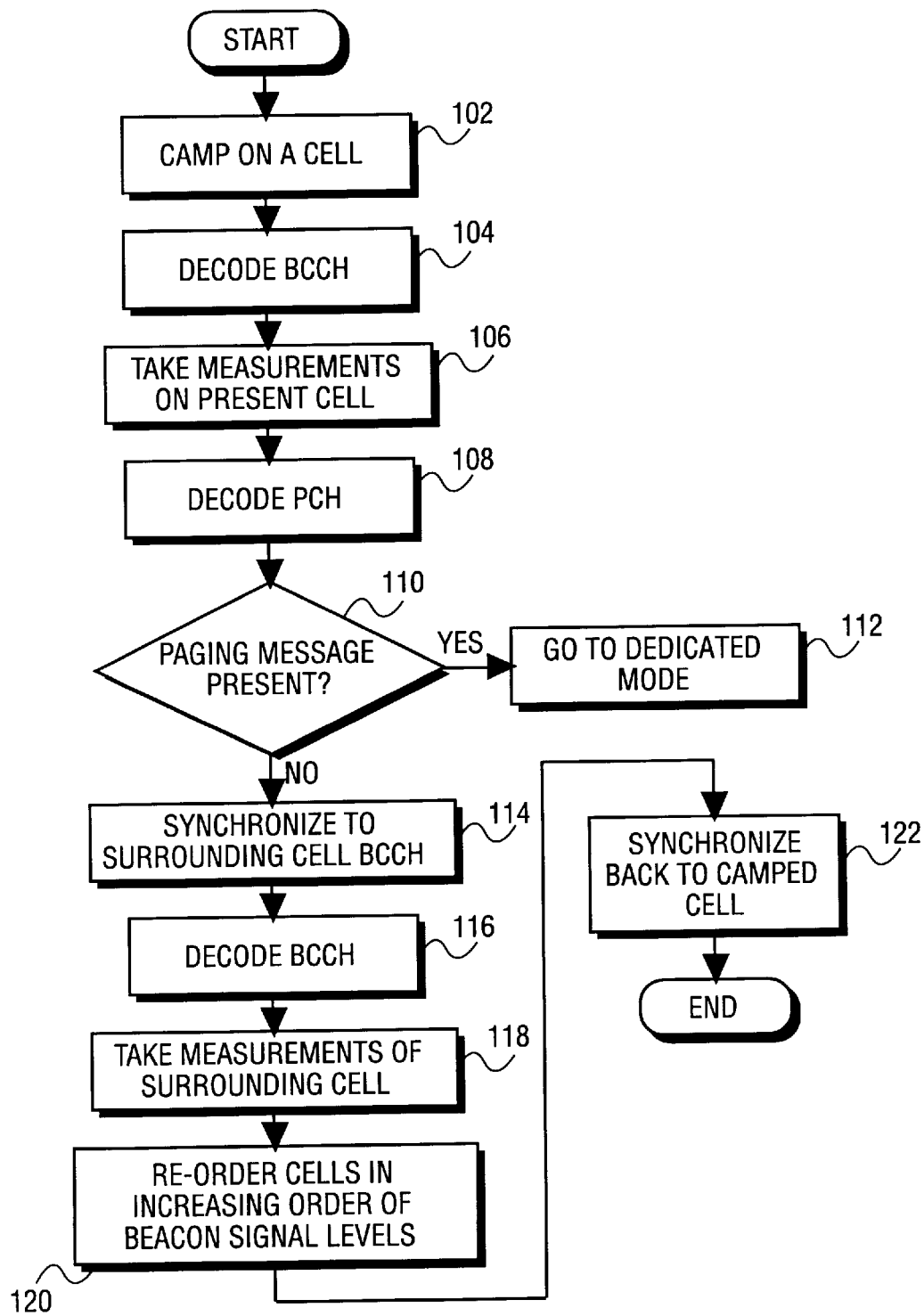
FIG. 2 is a flow diagram illustrating the operation of a prior art mobile.
Figure 3:
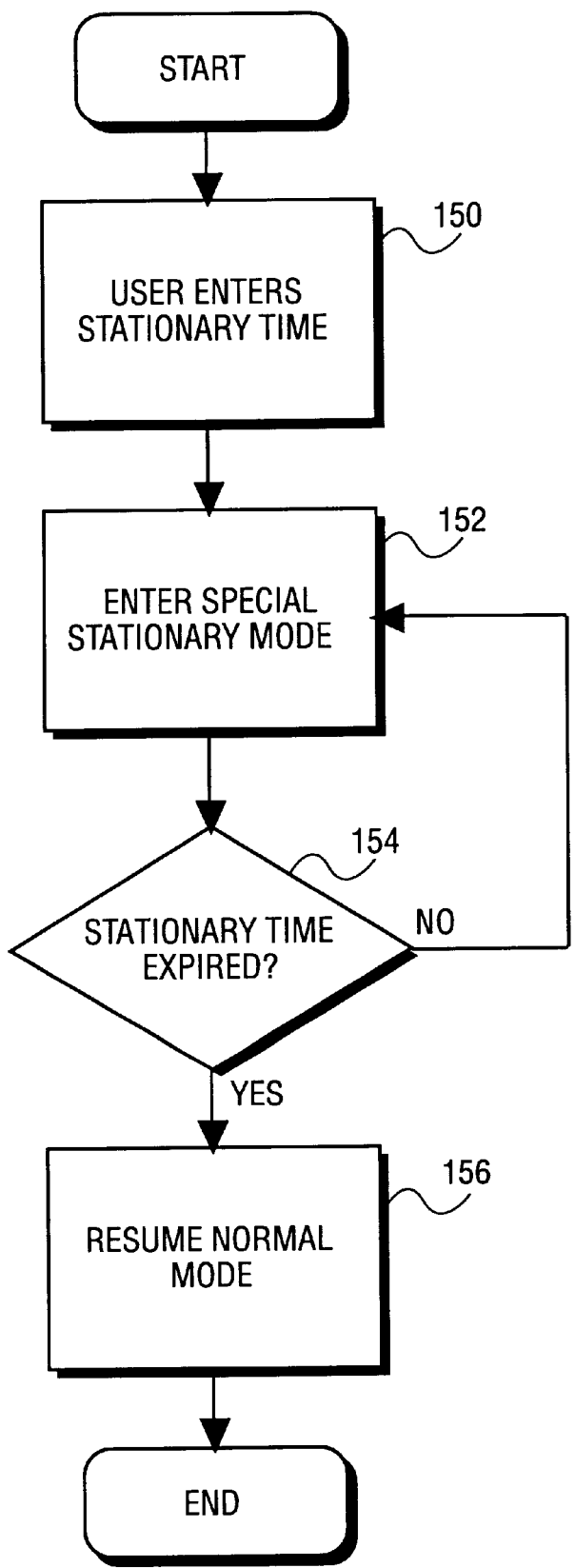
FIG. 3 is a flow diagram illustrating the operation of a mobile configured in accordance with the present invention; and, FIG. 4 is a flow diagram further illustrating the operation of the mobile configured in accordance with the present invention.

FIG. 3 is a flow diagram of the operation of the present invention where the user inputs a stationary time period in block 150. The user can input a time period for which the user predicts that the user will be in a general area. In an alternate embodiment, the user can signal to the mobile that the user will be in the general area for an indefinite time.

In block 152, the mobile enters a special mode of operation, as explained in detail in FIG. 4, below. This special mode of operation allows the mobile to save battery power by not monitoring the beacon signals from surrounding cells.

In block 154, the mobile checks to see if the stationary time period has expired. If it has not (i.e., the time period for which the user has specified in block 150 has not been reached), then operation will return to block 152. Otherwise, if the time the user has input in block 150 has been reached, then operation will continue with block 156.

In block 156, where the time period set by the user has been reached, then the mobile returns to the normal mode of operation where the mobile monitors all surrounding cells in addition to monitoring the current cell.

A problem with setting the mobile to be in this low-power, stationary mode for the predetermined time period is that if the user begins to move out of the general area of coverage of the current cell, the mobile will lose contact with the present cell as the signals from the present cell becomes weaker. In the prior art system, the mobile would have detected this movement because the signal strengths of the beacon signals from the surrounding cells would have become stronger while the signal strength of the beacon signal from the present cell would have become weaker. However, in the present invention, the surrounding cells are not monitored as in the prior art, the mobile has no way of comparing the signal strength of the beacon signal from the current cell to the signal strengths of the beacon signals of the surrounding cell. Instead, the mobile will move further away from the current cell, resulting in an increase of the bit error rate during the decoding of the PCH and, finally, loss of the beacon signal. The mobile will abandon the current cell after several unsuccessful consecutive attempts at decoding the PCH.

After the mobile abandons the current cell due to this down-link signalling failure, the mobile begins to search for another suitable cell on which to camp. Until the mobile finds another suitable cell with which to communicate, the mobile will be out of touch with the GSM system. However, the time that the mobile is out of contact with the GSM is short enough so as not to lose any incoming calls. Thus, even if the user decides to move before that pre-set time period has expired, the mobile will recover gracefully so as not to lose contact with the system when the mobile moves from the current cell to the next. As the special mode is not used when the mobile is in active use (i.e., the mobile cannot be placed in the power-saving mode when the user has an active connection), the user will not lose a call due to the mobile not monitoring surrounding cells.

In an alternate embodiment, where the user does not know how long the user is going to stay in a specific area, the user can place the mobile in the special mode until the user is about to change locations.

Figure 4:
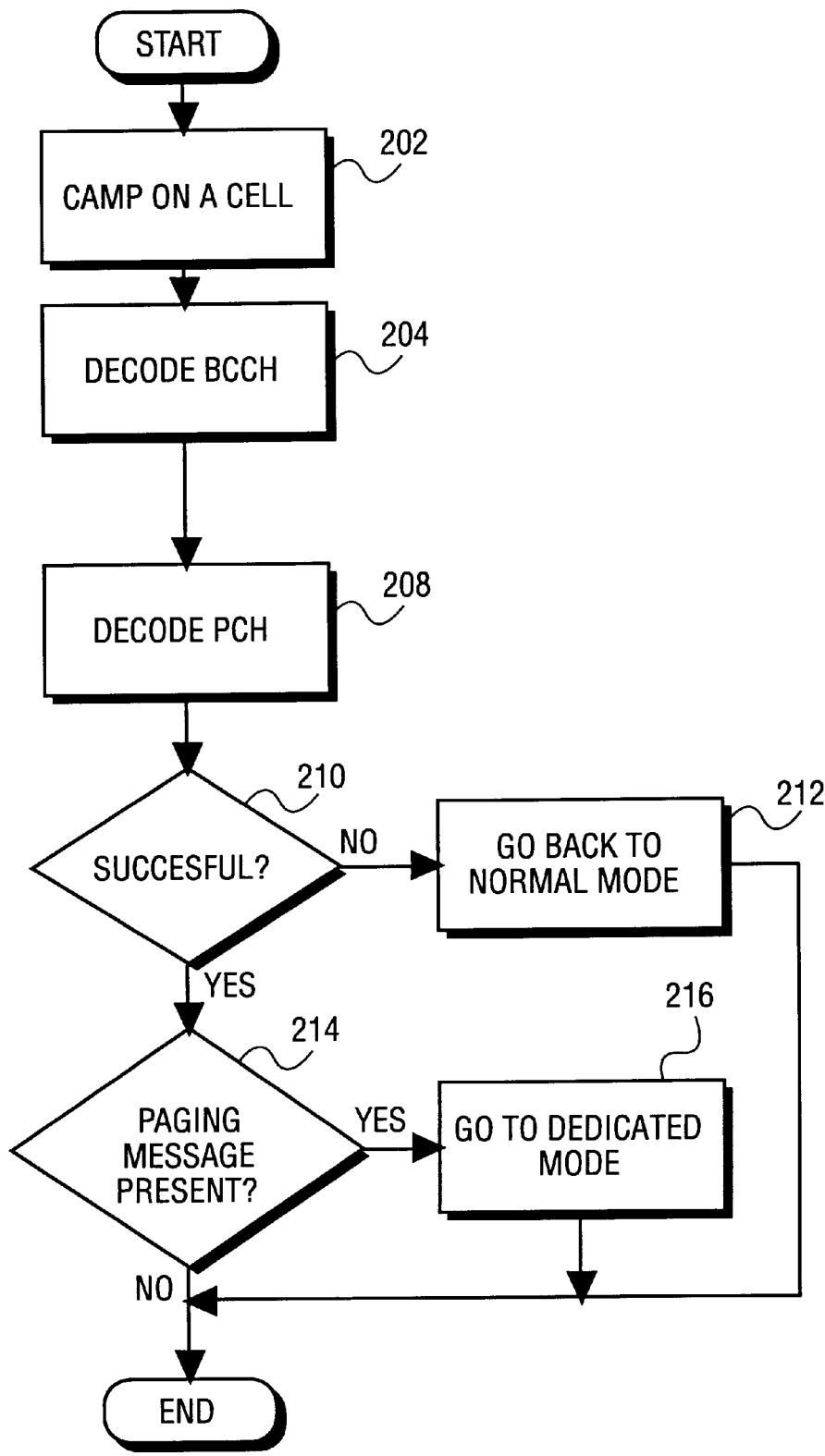

FIG. 4 is a flow diagram illustrating the operation of the present invention.

In block 202, the mobile camps on a cell to be used as the present cell. A cell is suitable if the mobile is able to communicate with it and decode information from the beacon signal of the cell. If there is more than one cell with which the mobile can communicate, the mobile will choose the cell with the strongest beacon signal strength.

In block 204, the mobile decodes the BCCH message from the present cell, operation will then continue with block 206.

In block 208, the mobile decodes the PCH to retrieve any messages that have been sent to the mobile.

In block 210, the mobile determines if the PCH has been decoded successfully. If the PCH has not been decoded successfully, operation will continue with block 212. Otherwise, if the PCH has been successfully decoded, then operation will continue with block 214.

In block 212, if the PCH has not been decoded successfully, then the mobile will assume that the signal from the present cell is too weak to be usable and switch back into a normal mode of operation. In this normal mode of operation, the mobile returns to monitoring and decoding the beacon signals of all cells.

In block 214, if the PCH was successfully decoded, then the mobile will check to see if there is a paging message present in the decoded PCH. If there is a paging message present, then operation will continue with block 216. Otherwise, operation will end.

In block 216, the mobile has detected a paging message, which indicates that there is an incoming call designated for the user of the mobile. Thus, the mobile switches to a dedicated mode to answer and process the incoming call.

In the low powered mode all that is spared is the periodic monitoring of surrounding cells, which is the most power consuming operation. The mobile still monitors the signal from the present cell because the mobile still has to look for incoming calls periodically. Thus, when the user moves away from the present cell, the mobile loses the beacon signal of the present cell and detects the movement of the user.

While the present invention has been particularly described with reference to the various figures, it should be understood that the figures are for illustration only and should not be taken as limiting the scope of the invention. Many changes and modifications may be made to the invention, by one having ordinary skill in the art, without departing from the spirit and scope of the invention.

What is claimed is:

1. In a mobile station, a method comprising:
    receiving a stationary time period input from a user, said stationary time period indicating a time that said user will be in a present cell, said present cell having been previously selected as a cell that services said mobile station;
    monitoring cell information for said present cell;
    monitoring paging information for said present cell;
    determining whether said stationary time period has been reached; and,
    only if said stationary time period has been reached, then monitoring cell information for a surrounding cell.

2. The method of claim 1, wherein said present cell information monitoring comprises:
    receiving cell information for said present cell; and,
    processing cell information for said present cell.

3. The method of claim 1, wherein said paging information monitoring comprises:
    receiving paging information for said present cell; and
    processing paging information for said present cell.

4. The method of claim 1, wherein said surrounding cell information monitoring comprises:
    receiving cell information for said surrounding cell; and,
    processing cell information for said surrounding cell.

5. The method of claim 1, further comprising switching over to said surrounding cell if said paging information for said present cell is invalid.

6. The method of claim 1, wherein said stationary time period is a pre-determined value.

7. In a mobile station, a method comprising the steps of:
    receiving a first signal from a user, said signal indicating that said user will be in a present cell for an indeterminate amount of time, said present cell having been previously selected as a cell that services said mobile station;
    monitoring cell information for said present cell;
    monitoring paging information for said present cell;
    determining whether said paging information for said present cell is valid; and,
    only if said paging information is invalid, then monitoring cell information for a surrounding cell.

8. The method of claim 7, wherein said present cell information monitoring comprises:
    receiving cell information for said present cell; and,
    processing cell information for said present cell.

9. The method of claim 7, wherein said paging information monitoring comprises:
    receiving paging information for said present cell; and
    processing paging information for said present cell.

10. The method of claim 7, wherein said surrounding cell information monitoring comprises:
    receiving cell information for said surrounding cell; and,
    processing cell information for said surrounding cell.

11. The method of claim 7, further comprising switching over to said surrounding cell if said paging information for said present cell is invalid.

12. An article comprising a computer readable medium having instructions stored thereon, which when executed, causes:
    receipt of a stationary time period input from a user, said stationary time period indicating a time that said user will be in a present cell, said present cell having been previously selected as a cell that services a mobile station;
    monitoring of cell information for said present cell;
    monitoring paging information for said present cell;
    determination of whether said stationary time period has been reached; and,
    only if said stationary time period has been reached, then monitoring of cell information for a surrounding cell.

13. The article of claim 12, wherein said present cell information monitoring comprises:

receipt of cell information for said present cell; and, processing of cell information for said present cell.

14. The article of claim 12, wherein said paging information monitoring comprises:

receipt of paging information for said present cell; and processing of paging information for said present cell.

15. The article of claim 12, wherein said surrounding cell information monitoring comprises:

receipt of cell information for said surrounding cell; and, processing of cell information for said surrounding cell.

16. The article of claim 12, where in the computer readable medium further having instructions stored thereon, which when executed, causes:

switching over to said surrounding cell if said paging information for said present cell is invalid.

17. The article of claim 12, wherein said stationary time period is a pre-determined value.

18. An article comprising a computer readable medium having instructions stored thereon, which when executed, causes:

receipt of a first signal from a user, said signal indicating that said user will be in a present cell for an indeterminate amount of time, said present cell having been previously selected as a cell that services said mobile station;

monitoring of cell information for said present cell;

monitoring of paging information for said present cell;

determination of whether said paging information for said present cell is valid; and, only if said paging information is invalid, then monitoring of cell information for a surrounding cell.

19. In a mobile station, an apparatus comprising:

means for receiving a stationary time period input from a user, said stationary time period indicating a time that said user will be in a present cell, said present cell having been previously selected as a cell that services said mobile station;

means for monitoring cell information for said present cell;

means for monitoring paging information for said present cell;

means for determining whether said stationary time period has been reached; and, only if said stationary time period has been reached, then monitoring cell information for a surrounding cell.

20. In a mobile station, an apparatus comprising:

means for receiving a first signal from a user, said signal indicating that said user will be in a present cell for an indeterminate amount of time, said present cell having been previously selected as a cell that services said mobile station;

means for monitoring cell information for said present cell;

means for monitoring paging information for said present cell;

means for determining whether said paging information for said present cell is valid; and, only if said paging information is invalid, then monitoring cell information for a surrounding cell.

* * * * *

UNITED STATES PATENT AND TRADEMARK OFFICE
CERTIFICATE OF CORRECTION

PATENT NO.    : 6,108,545 B1
DATED         : August 22, 2000
INVENTOR(S)   : Bhaktha Keshavachar Page 1 of 1

It is certified that error appears in the above-identified patent and that said Letters Patent is hereby corrected as shown below:

Column 4,
Line 44, after "signal" insert -- s --.

Signed and Sealed this

Twenty-sixth Day of February, 2002

Attest:

Attesting Officer

JAMES E. ROGAN
Director of the United States Patent and Trademark Office